(12) United States Patent
Engel et al.

(10) Patent No.: US 6,508,995 B1
(45) Date of Patent: Jan. 21, 2003

(54) PROCESS FOR PRODUCING PHASE-STABILIZED AMMONIUM NITRATE

(75) Inventors: Walter Engel, Woschbach (DE); Herbert Heinisch, Ettlingen (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/787,531

(22) PCT Filed: Sep. 11, 1999

(86) PCT No.: PCT/EP99/06746
§ 371 (c)(1),
(2), (4) Date: Mar. 20, 2001

(87) PCT Pub. No.: WO00/18704
PCT Pub. Date: Apr. 6, 2000

(30) Foreign Application Priority Data
Sep. 28, 1998 (DE) .......................................... 198 44 350

(51) Int. Cl.[7] ................................................. C01C 1/18
(52) U.S. Cl. ........................................ 423/266; 423/396
(58) Field of Search ................................. 423/396, 266

(56) References Cited

U.S. PATENT DOCUMENTS

| | | | |
|---|---|---|---|
| 3,018,164 A | | 1/1962 | Guth |
| 5,063,036 A | * | 11/1991 | Engel et al. ................. 423/266 |
| 5,071,630 A | | 12/1991 | Oberth |
| 5,292,387 A | * | 3/1994 | Highsmith et al. .......... 423/396 |

FOREIGN PATENT DOCUMENTS

| | | | |
|---|---|---|---|
| CA | 879586 | * | 9/1971 |
| DE | 16 46 327 | | 10/1970 |
| DE | 17 67 757 | | 9/1971 |
| DE | 21 25 755 | | 12/1972 |
| DE | 36 42 850 | | 2/1988 |
| EP | 0 405 272 | | 1/1991 |

OTHER PUBLICATIONS

Chemical Abstracts, vol. 129, No. 9, Aug. 31, 1998 Columbus, Ohio, US; abstract No. 110945b, P.B. Kempa et al.: "Dilatometric measurements of phase–stabilized ammonium nitrate (CuPSAN) performed by x–ray difraction" pp. 811; XP000789692, Abstract & Int. Annu. Conf. ICT 1998, 29th (Energetic Materials), 73.1–73.11.

Chemical Abstracts, vol. 120, No. 24, Juni 13, 1994 Columbus, Ohio, US; abstract No. 302684b, W. Engel etal.: "Ammonium nitrate, a less polluting oxidizer" pp. 234: XP000664046 Abstract & Int. Annu. Conf. ICT 1993, 24th (Energetic Materials: Insensitivity and Environmental Awareness), 3–1/3–9.

* cited by examiner

Primary Examiner—Wayne A. Langel

(57) ABSTRACT

A method for producing phase-stabilized particulate ammonium nitrate (AN) through integration of a diamine complex of the metals copper, nickel or zinc into the crystal lattice of AN, wherein AN is reacted with inorganic CU, Ni and/or Zn compounds, is characterized in that carbonates and/or hydroxide carbonates and/or hydroxides are added as inorganic compounds of the metals Cu, Ni and/or Zn. Moreover, additives are added to reduce the melting temperature of AN.

13 Claims, No Drawings

PROCESS FOR PRODUCING PHASE-STABILIZED AMMONIUM NITRATE

BACKGROUND OF THE INVENTION

The invention concerns a method for the production of phase-stabilized particulate ammonium nitrate (AN) by incorporating a diamine complex of the metals copper, nickel or zinc into the crystal lattice of the AN, wherein the AN is melted and reacted with inorganic copper, nickel and/or zinc compounds.

Ammonium nitrate is used as oxidant in propellants and explosive substances, in gas generators, in rockets and recently also in air bags. While AN disintegrates with slow heating at temperatures above its melting point of 169.5° C. into water and dinitrogen monoxide, disintegration at higher temperatures or under rapid heating (exothermal) can occur as a detonation thereby releasing oxygen, nitrogen and nitric oxides.

Pure AN has five different crystal modifications depending on the temperature, i.e. cubical in the temperature interval between 125° C. and its melting point of 169.5° C. (modification I), tetragonal in the temperature interval between 84° C. and 125° C. with a density of approximately 1.67 g/cm$^3$ (modification II), orthorhombic in the temperature interval between 32° C. and 84° C. with a density of approximately 1.66 g/cm$^3$ (modification III), also orthorhombic between −18° C. and 32° C. (modification IV), but with a density of approximately 1.73 g/cm$^3$ which represents a density change of approximately 4% compared with the density of modification III, and orthorhombic pseudotetragonal (modification V) at temperatures below −18° C. Modifications II and V are thereby very similar with respect to their density and their lattice structure and provide almost identical diagrams in X-ray diffraction measurements.

In particular, the density difference between the modifications III and IV during heating of AN to temperatures above 32° C. produces tension and the formation of cracks in the structure of the formed charges containing AN as oxidant.

Different types of additives have been proposed to phase-stabilize AN. It is e.g. known to stabilize modification III in the temperature interval between −20° C. and 100° C. through the addition of alkaline nitrates, such as potassium nitrate. The AN particles mixed with nitrates, however, tend to bake together and thereby exhibit poor flow and are difficult to homogenize in mixtures (U.S. Pat. No. 3,018,164). Moreover, modification III is not sufficiently stabilized through the addition of potassium nitrate, in particular when AN, mixed with potassium nitrate, cools down to temperatures below approximately −30° C.

Phase stabilization, which was successful in practice, of the similar modifications II and V and modification IV in a temperature interval of approximately −100° C. to 100° C. is achieved by adding metal ammoniates (metal ammine complexes), preferably via ammine complexes of the metals copper, nickel and zinc (DE 17 67 757 A1, DE 21 25 755, EP 0 405 272 B1).

Production of metal ammine complexes or integration in the crystal lattice of AN is effected e.g. through melting a mixture of AN and metal oxide (DE 21 25 755 C3). AN is thereby mixed with up to 10% of the metal oxide, is melted and the molten mass is transferred into a solid state. This method has the disadvantage that the ammine complex is insufficiently integrated into the AN lattice since the reaction between metal oxide and AN is very slow and the ammine complex disintegrates at an increased temperature, i.e. the melting temperature of ammonium nitrate. The formation frequency and simultaneous disintegration thus compete with one another and residues of the non-reacted metal oxides remain in the phase-stabilized product which have a negative influence on the combustion of ammonium nitrate.

EP 0 405 272 B1 discloses a method in which the diamine complex is produced through reaction of the metal oxide with AN in a solid-state reaction at 110° C. to 170° C. This method is also demanding and expensive since the diffusion rate of the solid-state reaction is low and there are residues of non-reacted metal oxides in the AN. Both lead to an inhomogeneous product. DE 36 42 850 C1 describes a method wherein melted AN is reacted with copper and/or nickel oxide thereby forming the respective diamine complexes (equations 1 and 2).

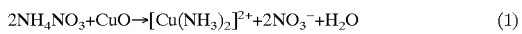

$$2NH_4NO_3+CuO \rightarrow [Cu(NH_3)_2]^{2+}+2NO_3^-+H_2O \qquad (1)$$

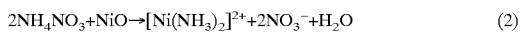

$$2NH_4NO_3+NiO \rightarrow [Ni(NH_3)_2]^{2+}+2NO_3^-+H_2O \qquad (2)$$

The molten mass must be prepared in small spatially separated charges for safety reasons to be subsequently processed in a spraying device into spherical phase-stabilized AN particles.

According to U.S. Pat. No. 5,071,630 A1, zinc oxide is used for forming the diamine complex instead of copper and/or nickel oxide. Zinc oxide is added to AN in the molten phase, the molten mass is dried with inert gas and charged with ammonia to replace the NH$_3$, discharged during drying. Subsequently, the molten mass is optionally dissolved in pure ammonium nitrate and the obtained product is cooled and granulated.

The metal oxides (CuO, NiO and ZnO) are thereby also disadvantageous since they react only slowly with AN and the formed diamine complex starts to disintegrate at temperatures above the melting temperature of AN. Small amounts of non-reacted nickel oxide or copper oxide therefore always remain in the product which have a negative influence on the burning behavior of AN. The metal oxides deposit in the reaction container and the production plant must be frequently cleaned to prevent transport of the deposited oxides into the subsequent charge. This increases the cost of the method. Moreover, contaminations, in particular, toxic nickel oxide cannot be excluded.

It is the underlying purpose of the invention to improve the known method by reducing the reaction time required for forming the diamine complex, preventing soiling of the product through non-reacted metal oxides, improving the quality of the product and reducing production costs.

SUMMARY OF THE INVENTION

In accordance with the invention, this object is achieved with the above-mentioned method in that carbonates and/or hydroxide carbonates and/or hydroxides and/or hydroxide nitrates are added as inorganic compounds of the metals copper, nickel and/or zinc.

The inventive compounds, having considerably less toxic substances than those of the corresponding oxides, achieve a reaction of almost 100% with considerably less reaction time such that there are no residues of the compounds in the product and in the reaction container. A highly pure phase-stabilized AN with exact specification is obtained.

DESCRIPTION OF THE PREFERRED EMBODIMENT

While the diamine complex of nickel (II) stabilizes the modification IV of AN, the diamine complexes of copper (II)

or zinc (II) stabilize the modifications II or V. In any case, the modification of AN stabilized in this fashion is stable within a large temperature range of approximately −100° C. to 70° C.

The large reaction yield achieved through adding copper, nickel or zinc carbonates, hydroxide carbonates, hydroxides, or hydroxide nitrates in accordance with the invention is based on the special reaction behavior of the carbonate or hydroxide anions and on the reduced stability compared to the corresponding metal oxides due to reduced lattice energy. The carbonate or hydroxide anions react spontaneously with the ammonium ion of AN thereby releasing ammonia (equations 3 and 4).

$$OH^- + NH_4^+ \rightarrow NH_3 + H_2O \quad (3)$$

$$CO_3^{2-} + 2NH_4^+ \rightarrow 2NH_3 + CO_2 \quad (4)$$

The produced ammonia reacts again with the respective cations of the metals Cu, Ni or Zn thereby forming the diamine complex.

The gross reactions of the hydroxides, carbonates and hydroxide carbonates with AN are exemplarily summarized in equations 5 through 7 for the copper cation.

$$2NH_4NO_3 + Cu(OH)_2 \rightarrow [Cu(NH_3)_2]^{2+} + 2NO_3^- + 2H_2O \quad (5)$$

$$2NH_4NO_3 + CuCO_3 \rightarrow [Cu(NH_3)_2]^{2+} + 2NO_3^- + CO_2 + H_2O \quad (6)$$

$$4NH_4NO_3 + Cu(OH)_2 \cdot CuCO_3 \rightarrow 2[Cu(NH_3)_2]^{2+} + 4NO_3^- + CO_2 + 3H_2O \quad (7)$$

Since copper carbonate (equation 6) is difficult to obtain in its pure form, the use of double salts such as $CuCO_3 \cdot K_2CO_3$ is possible. Instead of pure hydroxides, hydroxide nitrates such as $3Cu(OH)_2 \cdot Cu(NO_3)_2$, $Ni(OH)_2 \cdot Ni(NO_3)_2 \cdot 6H_2O$ or $4Zn(OH)_2 \cdot Zn(NO_3)_2 \cdot 2H_2O$ can also be added. AN is thereby not soiled with a foreign anion.

A further preferred embodiment provides that when the reaction of AN with the inventive additives for phase stabilization shall take place in the liquid phase, additives are added for reducing the melting temperature of AN to reduce the danger of explosion and the heating up time. The process may then be carried out in one single, optionally also large-volume reaction container such as e.g. heatable kneading devices, screw mixers or revolving cylindrical furnaces and must not be carried out, for safety reasons, in several small charges in parallel or one behind the other. The charge change can be considerably accelerated since the plant components do not have to be cleaned from soiling sediments. The inventive method can even be carried out continuously when corresponding technology is used for the system.

While in a preferred variant, additives can be added which reduce the melting point of AN according to Raoults' laws, it is possible to provide in particular such additives which form, in small concentrations in the AN molten mass, an eutectic mixture, to utilize a melting point in the eutectic range which is lower than that of the pure substances.

Preferably, water and/or metal nitrates are added. Water has the advantage that it volatilizes e.g. during spraying in a cooled gas sink flow. The advantage of metal nitrates is based on the fact that the ammonia nitrate is only soiled by the cation of the added metal nitrate if a different cation is selected than the cations copper, nickel or zinc added for phase-stabilization of AN in the form of carbonates, hydroxide carbonates and/or hydroxides. For this reason, in particular copper, nickel or zinc nitrate is used. If the quality of the phase-stabilized AN is not impaired by the presence of further cations, other nitrates, e.g. alkaline or alkaline earth nitrates such as $NaNO_3$, $Ca(NO_3)_2$ or $Mg(NO_3)_2$ can also be added. While the hydroxides, carbonates or hydroxide carbonates of the metals copper, nickel or zinc are added in an amount corresponding to the desired portion of the diamine complex in the product, the amount of the substances lowering the melting point may, optionally, be small. The proportion of the diamine complex with phase-stabilized AN for use in gas generators of rockets is 2 to 5 mass %, for use as propellant for air bags up to 50 mass %.

The invention is described below by means of examples:

EXAMPLE 1

48.5 kg of AN and 2.1 kg of $Cu(OH)_2 \cdot CuCO_3$ are mixed and melted in a melting vessel. When the molten mass has reached a temperature of 180° C., it is immediately sprayed in a cooling gas sink flow. The molten drops solidify into round parts which contain the diamine nickel (II) complex integrated in the ammonia nitrate lattice for phase stabilization. Depending on the setting of the spraying parameters, one obtains average grain sizes between 20 and 300 μm. The product, to which optionally up to 1% auxiliary substances can be added, such as anti-baking means, is used for producing solid propellants.

The quality of the ammonia nitrate phase-stabilized in this fashion was examined through wet chemical trace analysis for non-reacted copper hydroxide carbonate, which could not be found.

EXAMPLE 2

38.8 kg of AN and 2.0 kg of nickel hydroxide carbonate $NiCO_3 \cdot 2Ni(OH)_2 \cdot 4H_2O$ are mixed and heated in a vessel. To reduce the melting point, 1.2 l water is added corresponding to 3 weight %. Already at 120 to 130° C., the molten mass heats up considerably faster due to improved thermal transfer onto the molten material. During further heating with continuous stirring, a considerable part of the added water escapes when the vessel is open. The remaining water is removed in a spraying process according to example 1, wherein comparable grain sizes are obtained. Approximately 0.5% anti-baking agent is added to the product which is then used for producing solid propellants. Also in this case, wet chemical examination did not show any residues of non-reacted nickel hydroxide carbonate in the product.

EXAMPLE 3

For producing a product according to example 2, only 19.4 kg of AN and 2.0 kg of nickel hydroxide carbonate and 1.2 l water are heated in a vessel. Due to the small AN proportion, the mixture already melts at approximately 90° C. such that heating up is considerably accelerated by early switching on of the mixer. During further heating up, another 19.4 kg of AN is added thereby keeping the molten mass in a stirrable state. When the temperature has reached approximately 170°–180° C., the molten mass is sprayed. Gradual addition of AN achieves early melting and thus faster heating thereby permitting increase of the charges by up to 40% and therefore substantially reducing method costs.

EXAMPLE 4

38.8 kg of AN and 2.0 kg of nickel hydroxide carbonate $NiCO_3 \cdot 2Ni(OH)_2$ are mixed and heated in a vessel. To reduce the melting point, 0.2 kg of nickel nitrate hexahydrate is added. Already at 130° C. a stirrable molten mass is obtained which heats up more quickly due to improved heat transfer to the molten material. During further heating under continuous stirring, an essential part of the water added along with the nickel compounds escapes when the vessel is open. The rest of the water is removed in a spraying process according to example 1 wherein comparable grain sizes of the phase-stabilized AN are obtained. Approximately 0.5% anti-baking agent is added to the product which is then used for producing solid propellants. No traces of nickel hydroxide carbonate could be found.

EXAMPLE 5

95 g of AN is heated and melted e.g. in an oil bath to approximately 170°–180° C. 6.9 g zinc hydroxide carbonate $Zn(OH)_2 \cdot ZnCO_3$ were added to the molten mass under continuous stirring. The added zinc salt completely reacts within a few seconds to form a clear molten mass. The mixture is poured into a mortar and ground while it is still hot.

EXAMPLE 6

3.2 kg of AN is reacted with 1.1 kg of $Cu(OH)_2 \cdot CuCO_3$ in a heatable kneading device at approximately 140° C. for producing a phase-stabilized ammonium nitrate having a high proportion of diamine complex, e.g. for use in gas generators or air bags. With this mass proportion, the mixture contains, after completed reaction, the same molar amounts of AN and diamine copper (II). To reduce the melting temperature, 100 g of $Cu(NO_3)_2 \cdot 3H_2O$ is added. After 30 minutes, the temperature is reduced and the molten mass solidifies into a compact easy to handle product during operation of the kneading device.

The product was examined for non-reacted products of copper hydroxide carbonate using wet chemical and X-ray spectroscopic means. Even with such high additions, no negative result was obtained.

What is claimed is:

1. A method for producing phase-stabilized particulate ammonium nitrate through integration of a diamine complex into a crystal lattice of ammonium nitrate, the method comprising the steps of:

a) melting the ammonium nitrate; and
   b) reacting, following step a), the ammonium nitrate with at least one inorganic compound selected from the group consisting of copper carbonate, copper hydroxide carbonate, copper hydroxide, copper hydroxide nitrate, nickel carbonate, nickel hydroxide carbonate, nickel hydroxide, nickel hydroxide nitrate, zinc carbonate, zinc hydroxide carbonate, zinc hydroxide, and zinc hydroxide nitrate.

2. The method of claim 1, wherein said inorganic compound comprises at least one bivalent carbonate.

3. The method of claim 2, wherein said at least one bivalent carbonate is selected from the group consisting of $CuCO_3$, $NiCO_3$ and $ZnCO_3$.

4. The method of claim 1, wherein said inorganic compound comprises at least one bivalent hydroxide carbonate.

5. The method of claim 4, wherein said at least one bivalent hydroxide carbonate is selected from the group consisting of $Cu(OH)_2 \cdot CuCO_3$, $2Ni(OH)_2 \cdot NiCO_3 \cdot 4H_2O$, and $Zn(OH)_2 \cdot ZnCO_3$.

6. The method of claim 1, wherein said inorganic compound comprises at least one bivalent hydroxide.

7. The method of claim 6, wherein said at least one bivalent hydroxide is selected from the group consisting of $Cu(OH)_2$, $Ni(OH)_2$, and $Zn(OH)_2$.

8. The method of claim 6, wherein said inorganic compound comprises at least one bivalent hydroxide nitrate.

9. The method of claim 8, wherein said at least one bivalent hydroxide nitrate is selected from the group consisting of $Cu(OH)_2 \cdot Cu(NO_3)_2$, $Ni(OH)_2 \cdot Ni(NO_3)_2 \cdot 6H_2O$, and $4Zn(OH)_2 \cdot Zn(NO_3)_2 \cdot 2H_2O$.

10. The method of claim 1, further comprising the inclusion of additive for reducing a melting temperature of the ammonium nitrate.

11. The method of claim 10, wherein said additive is water.

12. The method of claim 10, wherein said additive is at least one metal nitrate.

13. The method of claim 12, wherein said at least one metal nitrate is selected from the group consisting of copper nitrate, nickel nitrate, and zinc nitrate.

* * * * *